EDWARD A. FRANKLIN.
Improvement in Fluting Sad-Irons.

No. 120,869.      Patented Nov. 14, 1871.

Witnesses: E. Wolff, Francis McArdle

Inventor: Edward A. Franklin per Attorneys

UNITED STATES PATENT OFFICE.

EDWARD A. FRANKLIN, OF BRENHAM, TEXAS.

IMPROVEMENT IN FLUTING SAD-IRONS.

Specification forming part of Letters Patent No. 120,869, dated November 14, 1871.

*To all whom it may concern:*

Be it known that I, EDWARD A. FRANKLIN, of Brenham, in the county of Washington and State of Texas, have invented a new and useful Improvement in Fluting Sad-Irons; and I do hereby declare that the following is a full, clear, and exact description thereof, which will enable others skilled in the art to make and use the same, reference being had to the accompanying drawing forming part of this specification, in which—

Figure 1:
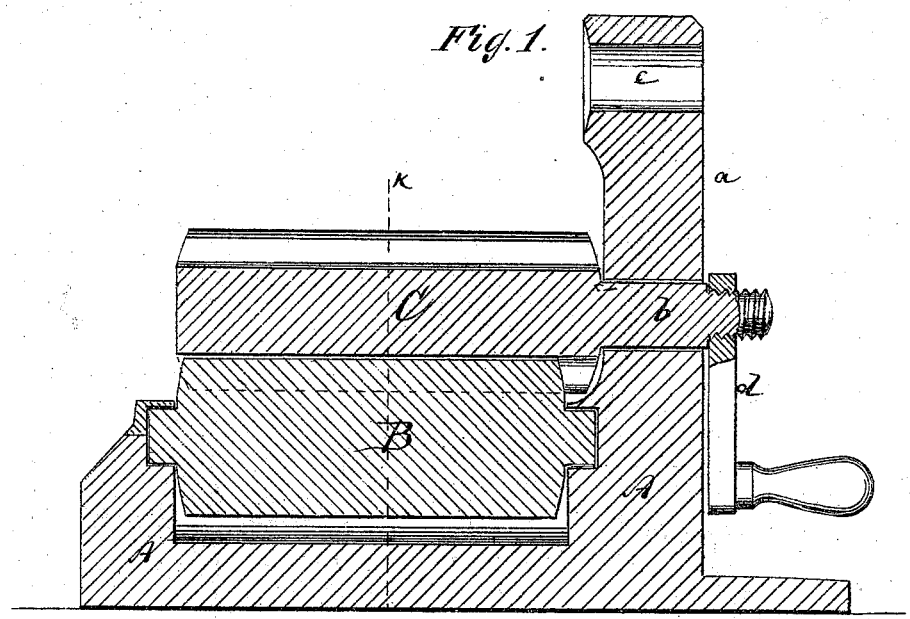
Figure 2:
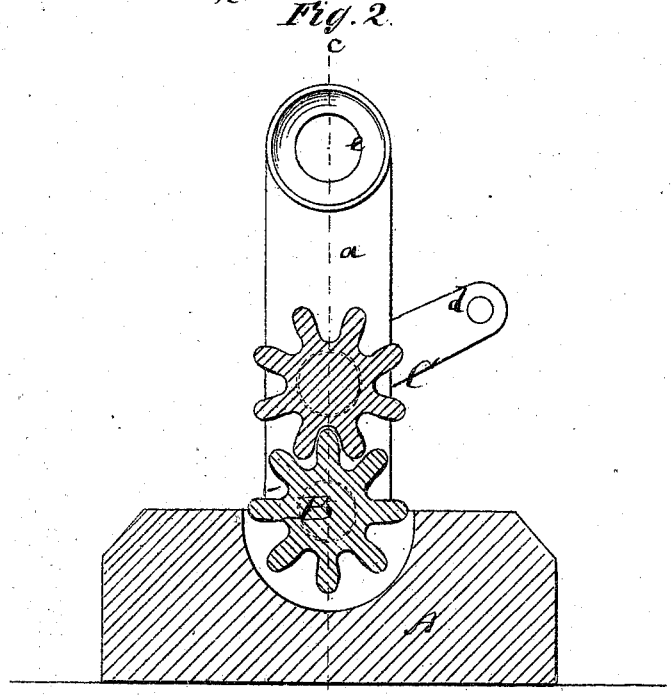

Figure 1 represents a longitudinal vertical section of my improved fluting sad-iron, the line $c\,c$, Fig. 2, indicating the plane of section. Fig. 2 is a vertical transverse section of the same taken on the plane of the line $k\,k$, Fig. 1.

Similar letters of reference indicate corresponding parts.

This invention relates to a new combination of fluting and sad-iron, of such kind that the upper fluting-roller will serve as handle for the sad-iron, there being thus no loose or separate parts required for the two functions.

A in the drawing represents the body of the sad-iron, $a\,a$ being a projecting stem on the same. B is the lower, and C the upper fluting-roller. The lower roller B hangs in a cavity which is provided in the top of the iron A, as shown, while the projecting axle $b$ of the upper roller is fitted through a hole in the stem $a$ and constitutes, thus, the support for said roller C. The operating-crank $d$ is screwed to the left-handed thread of the axle $b$, and will thus, when used for fluting, so turn the rollers that they take the cloth from the operator when the crank is turned toward him or her. When not used for fluting the crank $d$ is unscrewed and the roller C transferred to the upper part of the stem $a$, where there is a hole, $e$, for the reception of the axle $b$. The stem $a$, it is seen, is wider on top in order to furnish a more substantial support for the roller C when raised. After the crank is reapplied the roller is in position to constitute the handle of the sad-iron.

Having thus described my invention, I claim as new and desire to secure by Letters Patent—

The fluting sad-iron, composed of the body A, roller B, combined roller and handle C, and crank $d$, all arranged substantially as herein shown and described.

EDWARD A. FRANKLIN.

Witnesses:
A. MEYER,
B. R. FRANKLIN. (91)